C. S. BONNEY,
Assignor to Lloyd, Supplee & Walton.
HOLLOW AUGER.
No. 7,689. Reissued May 22, 1877.
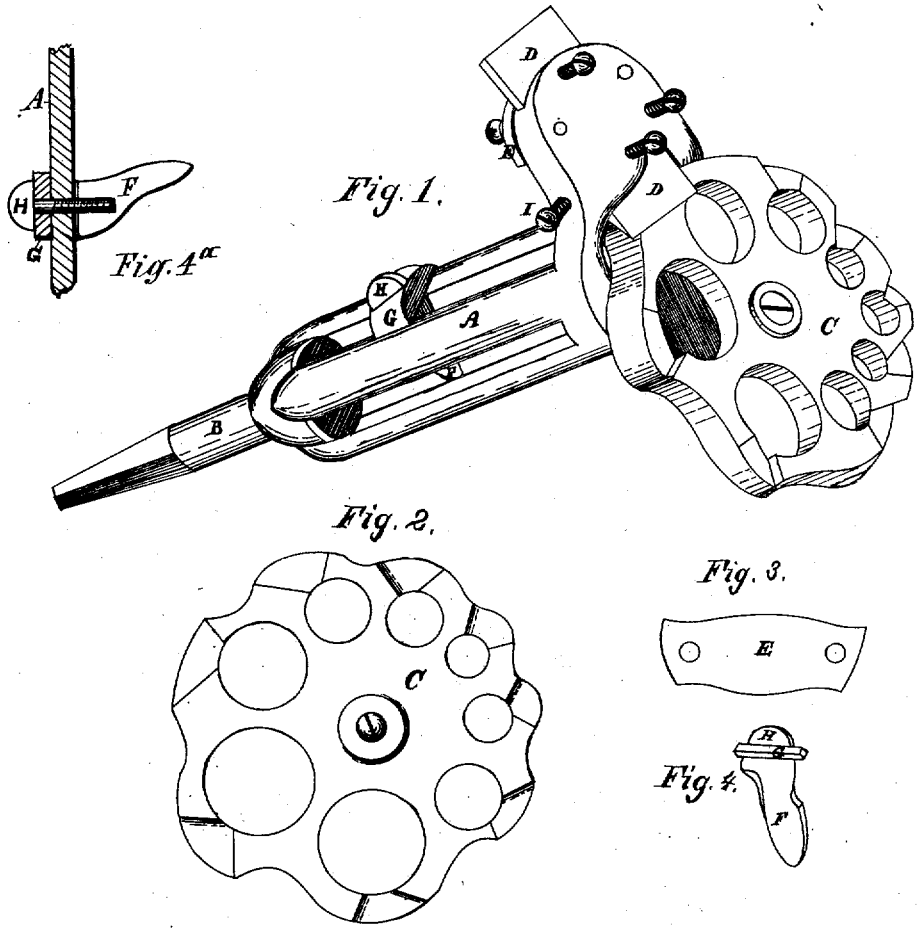
Witnesses
L. B. Gould,
V. D. Dearborn,
Inventor.
C. S. Bonney
George W. Hey,
Atty
N. PETERS, PHOTO-LITHOGRAPHER, WASHINGTON, D. C.

UNITED STATES PATENT OFFICE.

CHARLES S. BONNEY, OF PHILADELPHIA, PENNSYLVANIA, ASSIGNOR TO LLOYD, SUPPLEE & WALTON, OF SAME PLACE.

IMPROVEMENT IN HOLLOW AUGERS.

Specification forming part of Letters Patent No. 105,896, dated August 2, 1870; reissue No. 7,689, dated May 22, 1877; application filed March 12, 1877.

*To all whom it may concern:*

Be it known that I, CHARLES S. BONNEY, of Philadelphia, State of Pennsylvania, formerly of Syracuse, State of New York, have invented a new and useful Improvement in Hollow Augers; and I do hereby declare that the following is a full and complete description of the same, reference being had to the annexed drawing, making a part of this specification, in which—

Figure 1 is a perspective view of the auger complete. Fig. 2 is a view of the revolving disk; Fig. 3, a view of the bar which holds the knife; Fig. 4, view of adjustable stop, by which the tenon may be made of different lengths. Fig. 4ª is a sectional view of the adjustable stop, showing its construction and the manner of securing it to the body A.

The nature of my invention consists in making a hollow auger, which will be easily adjusted to cut different sizes and lengths of tenons.

To describe my invention more fully, A is a metal cylinder or barrel with longitudinal slots or openings, with the metal shank B in the lower end, and the revolving disk C and the knife D on the upper end. B is a shank for connecting the auger to a brace or other device for using the same. C is a disk, which revolves upon a pin or hub on the barrel A, with different sizes of holes in it to correspond with the different sizes of tenons that it is desired to make.

D is the knife which cuts the tenon to fit any sized hole to which it is set, and which can be elevated or depressed by the three screws bearing upon its upper surface, and which is held in position by the bar E, which is pressed against its under surface by screws at each end, and by the screws I against the edge.

To regulate the length of tenon, I provide an adjustable device consisting of the stop-piece F, the flat strap or clamp-piece G, and the screw H. The stop-piece consists of a taper curved piece of metal faced off on its widest extremity, so as to allow it to bear at right angles against one or more of the upright ribs or bars of the frame or body A of the auger. It has also a threaded screw-hole, into which the screw H passes. The stop-piece is placed inside of the auger, and the screw H is inserted through the strap or clamp-piece G into the screw-hole of the piece F. The cross-bar G bears against the exterior edges of one or more of the upright ribs of the frame, and when the screw is turned in tightly, the whole device is securely retained by the compression of the stop part F and the clamp-bar G against each other and the frame A.

It will be observed that the stop can be readily moved to any desired point in the length of the body, and there retained by means of the screw B, thus producing an effective device for determining the length of the tenons.

What I claim as new, and desire to secure by Letters Patent, is—

1. The combination of the revolving disk C with the hollow-auger body A, substantially as and for the purposes specified.

2. The disk C, revolving upon a screw as its axis, and constructed with a series of dies for forming different-sized tenons, substantially as, and as herein specified.

3. An adjustable stop, consisting of the combination of the stop-piece F, the strap or clamp-piece G with each other, and the operating screw H, substantially as herein shown and described, and for the purpose set forth.

4. The combination of the recessed cutter-seat of the body A of a hollow auger with the cutter D, and the supporting bar or strap E, as shown and described, and for the purposes set forth.

CHARLES S. BONNEY.

Witnesses:
WM. R. HOWELL,
D. W. WORRALL.